Figure 1:
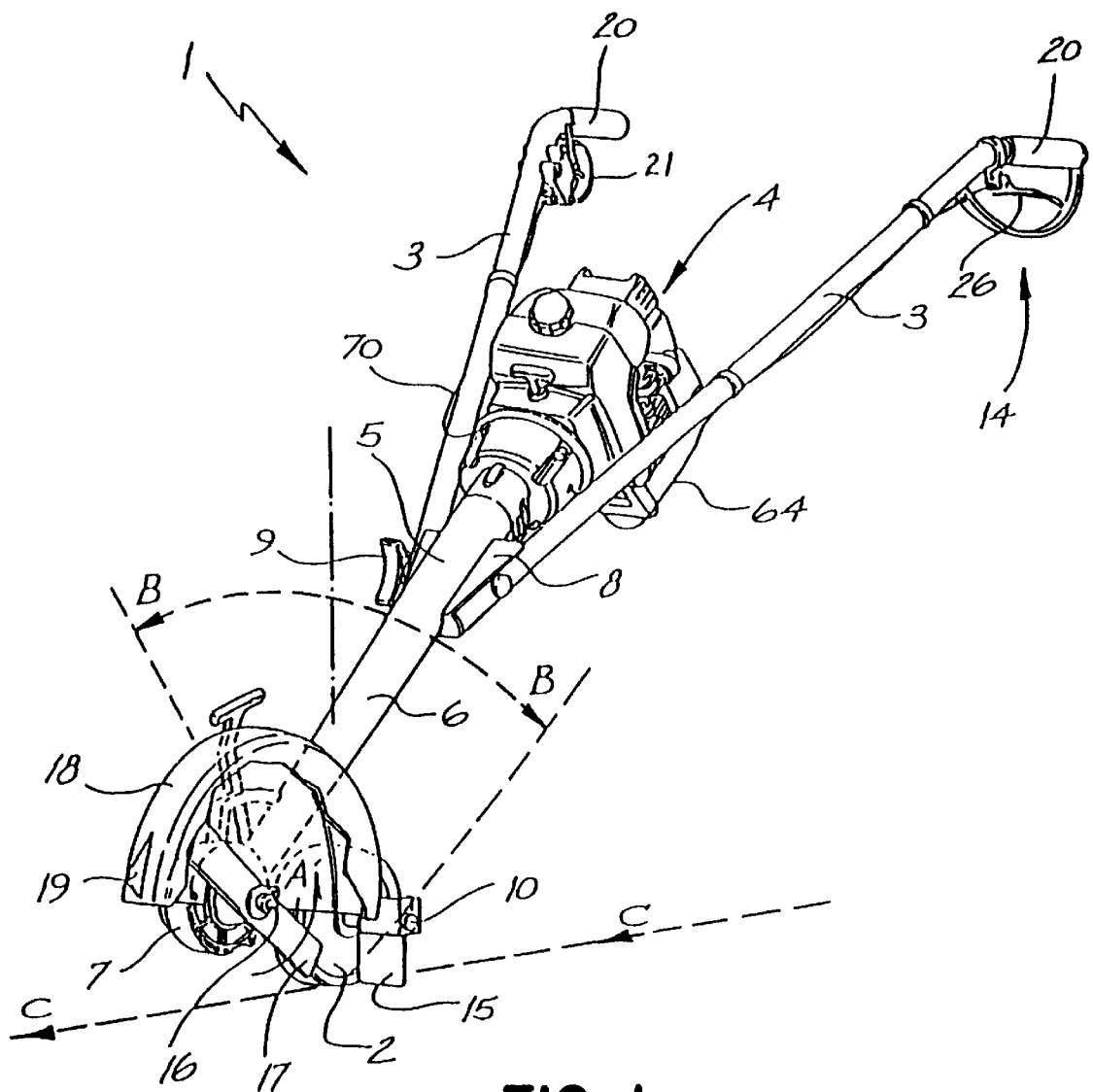

United States Patent
Notaras et al.

[11] Patent Number: 5,826,667
[45] Date of Patent: Oct. 27, 1998

[54] LAWN EDGER

[76] Inventors: John Arthur Notaras, 6 Carrington Avenue, Strathfield NSW 2135, Australia; Angelo Lambrinos Notaras, 86 Victoria Road, Bellevue Hill NSW 2023, Australia

[21] Appl. No.: 254,231

[22] Filed: Jun. 6, 1994

[30] Foreign Application Priority Data

Sep. 6, 1993 [AU] Australia ................................ PL9298

[51] Int. Cl.⁶ ................................................. A01D 53/14
[52] U.S. Cl. .................................. 172/15; 172/17; 56/256
[58] Field of Search ................................ 172/13, 15, 17; 56/256, 11.3, 11.7, 17.2; 74/526

[56] References Cited

U.S. PATENT DOCUMENTS

| | | |
|---|---|---|
| Re. 32,266 | 10/1986 | Tuggle et al. . |
| 2,478,813 | 8/1949 | Esleck . |
| 2,618,919 | 11/1952 | Hutchens . |
| 2,621,463 | 12/1952 | Skillman . |
| 2,632,990 | 3/1953 | Stricklen . |
| 2,653,381 | 9/1953 | Rooke . |
| 2,672,002 | 3/1954 | Nelson . |
| 2,680,945 | 6/1954 | Reed . |
| 2,706,941 | 4/1955 | Swanson . |
| 2,707,859 | 5/1955 | Walker . |
| 2,708,335 | 5/1955 | Newton . |
| 2,719,398 | 10/1955 | Hutchens . |
| 2,791,875 | 5/1957 | Faas . |
| 2,847,813 | 8/1958 | Hanson, Jr. . |
| 2,855,742 | 10/1958 | Cooper . |
| 2,930,176 | 3/1960 | Lindell . |
| 3,090,186 | 5/1963 | Dykes . |
| 3,130,793 | 4/1964 | Allegretti . |
| 3,168,147 | 2/1965 | Peters . |
| 3,188,783 | 6/1965 | Legge ...................................... 56/256 X |
| 3,193,996 | 7/1965 | Wellborn . |
| 3,490,213 | 1/1970 | Pinto . |
| 3,533,223 | 10/1970 | Gunn . |
| 3,734,196 | 5/1973 | Mangum . |
| 3,743,028 | 7/1973 | McCloud . |
| 3,852,944 | 12/1974 | Zuercher ................................... 172/15 |
| 4,033,098 | 7/1977 | Green . |
| 4,182,100 | 1/1980 | Letter . |
| 4,277,936 | 7/1981 | Hoff ......................................... 56/11.7 |
| 4,286,675 | 9/1981 | Tuggle . |
| 4,364,435 | 12/1982 | Tuggle . |
| 4,432,139 | 2/1984 | Köhler ...................................... 30/381 |
| 4,442,659 | 4/1984 | Enbusk . |
| 4,503,630 | 3/1985 | Riley ....................................... 172/112 |
| 4,531,350 | 7/1985 | Huthmacher . |
| 4,669,590 | 6/1987 | Zindler et al. ............................ 56/163 |
| 4,696,150 | 9/1987 | Geeck, III ............................... 56/11.7 |
| 4,803,831 | 2/1989 | Carmine . |
| 4,845,929 | 7/1989 | Kawasaki . |
| 4,879,869 | 11/1989 | Buckendorf, Jr. . |
| 4,894,916 | 1/1990 | Nimz . |
| 4,922,694 | 5/1990 | Emoto . |
| 4,936,271 | 6/1990 | Nagashima et al. .................... 123/195 |

(List continued on next page.)

FOREIGN PATENT DOCUMENTS 107917 12/1938 Australia .

OTHER PUBLICATIONS

Weed Eater (no other info).
Masport (no other info).

*Primary Examiner*—Terry Lee Melius
*Assistant Examiner*—Christopher J. Novosao
*Attorney, Agent, or Firm*—Hugh D. Jaeger

[57] ABSTRACT

A powered lawn edger which is steerable by a walking operator in the manner of a wheelbarrow. The edger has a Y-shaped frame including a pair of handles each with handlegrips. A power unit is mounted on the frame between the handlegrips and a ground engaging wheel. A cutting blade is rotatable about an output shaft of a gear box which is powered from the power unit via a centrifugal clutch having a brake. A debris deflector is mounted on the axle of the wheel. An adjustment mechanism is provided to adjust the height of the cutting blade relative to the ground. The height of the debris deflector relative to the ground remains unchanged when the height of the cutting blade is adjusted.

20 Claims, 10 Drawing Sheets

U.S. PATENT DOCUMENTS

| | | |
|---|---|---|
| 4,936,886 | 6/1990 | Quillen . |
| 4,962,631 | 10/1990 | Braun . |
| 4,979,573 | 12/1990 | Williamson ............................ 172/15 |
| 4,984,417 | 1/1991 | Braun . |
| 5,029,435 | 7/1991 | Buchanan . |
| 5,095,687 | 3/1992 | Andrew . |
| 5,156,217 | 10/1992 | Hirata . |
| 5,165,485 | 11/1992 | Fujikawa . |
| 5,259,175 | 11/1993 | Schmidt ................................ 56/17.2 |
| 5,407,012 | 4/1995 | Klöpfer ................................... 172/15 |
| 5,490,371 | 2/1996 | Potucek, III ............................ 56/256 |

LAWN EDGER

The present invention relates to powered lawn edgers. In particular, the present invention relates to a safe, compact, streamlined, and extremely manoeuvrable powered lawn edger which is steerable with both hands in the manner of a wheel barrow.

Hitherto, powered lawn edgers have been able to be divided into several categories. The first is a multi-wheeled carriage which is self supporting on its wheels and which is pushed along its intended path. The best known member of this class is essentially a conventional domestic lawn mower type but with a cutting element rotating in a vertical plane. Another category is a hand held device which does not normally have any ground engaging wheels and which is carried by the operator. The best known of these devices are the various types of brush cutter or trimming devices.

The brush cutter type of device generally includes a nylon filament as a cutting element. This cutting element is attached to a cutter head which is set at one (lower) end of a long drive shaft. The drive shaft is supported by the operator at an angle of approximately 45° to the horizontal. The shaft has an engine at its other (upper) end with the engine mostly situated behind the operator and in some other cases beside the operator. The cutter head rotates about a substantially horizontal plane in normal use and is intended, for example, to trim grass growing adjacent tree trunks, to mow grass in small and/or awkward areas, and the like. Therefore in order to trim the edge of a lawn adjacent a footpath, for example, it is necessary for such an apparatus to be completely carried whilst being twisted by approximately 90° about its longitudinal axis in order to bring the plane in which the cutting device rotates into an inclined, but nearly vertical, position. This places the complete apparatus in an extremely out of balance position and this particularly awkward motion requires an awkward operator position. Also a particularly awkward crab-like walking motion is required during use. Indeed most operators walk backwards, and sideways simultaneously. Therefore it is both difficult and tiring to execute.

As a consequence, any health problem of the operator, such as common back ache, can be exacerbated by this stooped and unnatural position. The tiredness of the operator is further increased by the need to actually carry, and therefore support the entire weight of, the device during its operation. Furthermore, unlike a blade of a lawn edger, the nylon filament of such trimming devices does not cut into the soil surface and therefore does not give a clean cut or neat edge.

Other prior art variations include lawn edge cutting attachments for such brush cutter devices. These include those in which the rotatable implement rotates in a substantially vertical plane. Typically these devices use a short, high peripheral speed, cutter blade which penetrates the soil surface to edge the lawn. However, these devices, with the engine behind or beside the operator, still suffer from the fundamental disadvantage that the entire weight of the apparatus is carried by the operator at an angle of about 45 degrees away from the cutter blade axis. Furthermore, to make the cutter blade penetrate the soil surface, the operator has to stoop further in order to force the entire cutting head downwardly.

These prior art brush cutter type devices also only have a safety guard parallel to (and positioned above) the cutting head for protection during normal grass cutting when the head is cutting horizontally. As a result, when the apparatus is manoeuvred so that the cutting head is rotating in a near vertical plane for lawn edging, then this exposes the cutting head and allows any hidden object such as stones, sand or even foreign objects such as nails from previous building debris etc, to be thrown up out of the grass at speed. Of course, such objects then become high speed projectiles which are dangerous to both operator and to bystanders, be they distant or close by.

It is also known for some such prior art brush cutter devices to be fitted with a small roller attached to the device near the cutter head. These devices still have their engine alongside, or behind, the operator so the majority of the weight is still supported by the operator with the same generally awkward stance and movement as described above. One hand of the operator carries the majority of weight whilst the other hand of the operator holds down, or forces down, the cutter head. Again this causes stooping which exacerbates any back problem. Back problems are a major source of health insurance injury claim and are a major source of injury for manual labourers.

Various prior art devices in the form of a wheeled dolly have been proposed in order to support such brushcutter devices. The following U.S. patents are typical of such devices, U.S. Pat. No. 4,182,100 (Letter); U.S. Pat. No. 4,442,659 (Enbusk); U.S. Pat. No. 4,531,350 (Huthmacher); U.S. Pat. No. 4,803,831 (Carmine); U.S. Pat. No. 4,879,869 (Buckendorf); U.S. Pat. No. 4,894,916 (Nimz); U.S. Pat. No. 4,922,694 (Emoto); U.S. Pat. No. 4,936,886 (Quillen); U.S. Pat. No. 5,029,435 (Buchanan); and U.S. Pat. No. 5,095,687 (Andrew).

Similarly, two U.S. Pat. No. 4,364,435 and U.S. Pat. No. Re 32,266, both to Tuggle disclose a single, small diameter, roller support for a brushcutter device, and an earlier U.S. Pat. No. 4,286,675 also to Tuggle discloses a single wheel support for a brushcutter. In these three patents, the weight of the engine of the brushcutter is supported by a handle connected to that engine whilst an outrigger handle is provided for stability. Again, because the heaviest component of the device, namely the engine, is directly supported by a handle held by the operator, the operator awkwardly supports most of the weight of the device with one bent arm. The other arm is outstretched and holds the outrigger handle.

A further problem to be considered is the expected restrictions to be placed on small two-stroke (two-cycle) engines because of the pollution such engines create over and above that created by four-stroke engines. As a consequence, the light weight two stroke power units currently used in brushcutters and similar devices are likely to be banned in some jurisdictions in future for anti-pollution reasons. The engineering result of this is that commercially acceptable power units are henceforth likely to be restricted to four-stroke internal combustion engines and electric motors, both of which are substantially heavier than two-stroke engines. It follows therefore that in future those brush cutters in which the operator carries the weight of the apparatus will become eventually impractical.

The wheeled carriage class of prior art lawn edger typically has three (or sometimes four) wheels arranged so as to enable the edger to be free standing, with upstanding handles, and also self supporting on its wheels. These wheels hold the device so that the rotatable cutters rotate in a substantially vertical plane. The device is pushed in a manner analogous to that of a lawn mower. Because these self supporting 3 and 4 wheeled carrriage grass edgers have a long wheel base to self support the apparatus, when pushed (forward) their natural track is straight and therefore to edge around a curve is very difficult with the operator having to "bounce", or reciprocate, or drag, the apparatus around, to try and approximate to the curve which the non-steerable carriage wheels will not follow. Also the weight of these prior art devices is distributed amongst the three or four carriage wheels so the cutter blade does not have a great deal of weight (downwardly direct force) applied to it. This is due to the long leverage distance between the cutter blade axis and the rear wheels (which constitute the pivot point when reaction forces are applied to the blade when the blade strikes hard ground). As a consequence, the blade pushes the front of the machine upwardly when blade strikes hard ground. As a result, in hard soils this weight distribution and reaction force can cause the carriage to "bounce" and be less stable.

In addition, because of the wide side to side spacing between the wheels of the free standing carriage, necessary to make the carriage stable, it is difficult to tilt the edger so as to move the cutting blade out of the vertical the plane in which it rotates. Typical of these are prior art devices are those disclosed in the following U.S. Pat. No. 2,847,813 (Hanson); U.S. Pat. No. 3,130,793 (Allegretti); and U.S. Pat. No. 3,734,196 (Mangum).

For a prior art edger having a three (or four) wheeled carriage, it is possible for the edger to be tilted sideways in one direction. This is the direction in which the wheel(s) furthest from the cutter is lifted. This tilts the lower edge of the "disc" in which the blades rotate towards the lifted wheel. This is generally non-effective since the movement of the "disc" in which the blades rotate is towards the wheels. In order to tilt the "disc" in the other direction, it is necessary to raise the engine and so the cutter blade is raised upwardly, away and well clear from the ground surface. This is caused by the spacing between the cutter blade and the remaining ground engaging wheel(s). The raised "disc" means that the cutter blade(s) do not come into contact with the material to be cut. U.S. Pat. No. 2,847,813 (Hanson); U.S. Pat. No. 3,130,793 (Allegretti) and U.S. Pat. No. 3,734,196 (Mangum); and WEEDEATER (Registered Trade Mark) gasoline model GE21 as sold by ELECTROLUX exemplify this art. This inability to operatively tilt the device creates substantial problems particularly in edging against walls and fences and in also in edging adjacent curbs and gutters.

In order to overcome this problem it is known to provide some models of such wheeled carriage edgers, and these can be categorised as heavy duty edgers, with a swivel mechanism to enable the cutting blade(s) to be tilted out of the vertical plane. Generally such swivel mechanisms take the form of a tiltable axis of rotation of the cutter, and a V-belt drive which is able to accommodate the necessary twisting required whilst still transmitting power. The power unit remains untilted. Whilst such arrangements are functional, the devices are heavier, more complicated and more expensive. In addition, the (often exposed) V-belt drives are dangerous.

Such prior art heavy duty edgers also require the operator to pull or push a locking device, and/or twist or pull or push a lever, so that the plane of the cutter is tilted and locked at its desired position. This is an operation that is not fast or simple, and for old or less athletic operators in domestic situations can be difficult to execute. These belt drive edgers also are provided with an adjustment mechanism to tension the belt drive. Thus the motor and cutter blade shaft are not at a fixed distance from each other.

Examples of prior art wheeled carriage devices which have attempted to deal with this problem include U.S. Pat. No. 2,680,945 (Reed); U.S. Pat. No. 2,791,875 (Faas); U.S. Pat. No. 2,885,742 (Cooper); U.S. Pat. No. 2,930,176 (Lindell); U.S. Pat. No. 3,090,166 (Dykes); U.S. Pat. No. 3,193,996 (Wellborn); U.S. Pat. No. 3,490,213 (Pinto); U.S. Pat. No. 3,743,028 (McCloud); U.S. Pat. No. 4,962,631 (Braun); U.S. Pat. No. 5,156,217 (Hirata); and U.S. Pat. No. 5,165,485 (Fujikawa). The commercially available MASPORT (Registered Trade Mark) model 6002 DLX also has a blade tilting arrangement. All of these "heavy duty" wheeled edgers are heavy and bulky; difficult to transport, cannot fit into a boot or trunk of even a large car, and require a great deal of room for storage.

Another example of a prior art device in which the cutting blades are able to be tilted out of the vertical plane is provided by U.S. Pat. No. 2,970,419 (Lieberman). This device enables a cut to be achieved both in a horizontal plane and in a vertical plane. When cutting in a horizontal plane the device is supported by a pair of wheels 40 and when cutting in a vertical plane the device is supported by a roller 54. U.S. Pat. No. 2,672,002 (Nelson) discloses a somewhat similar device which, when cutting in the vertical plane is supported by single wheel 15 in front of the cutter blade, but when cutting in the horizontal plane Is supported by a skid bar 28. Because of the skid bar 28 it is necessary to "shove or push" the device in the direction of the bar 29 utilising a handle 31 which has "any desirable cross-head" and therefore is substantially T-shaped in configuration.

U.S. Pat. No. 2,621,463 (Skillman) discloses a similar arrangement in which the device is supported in both cutting actions by a roller 11 having a substantial axial extent. Again, the cutting blades are able to be pivoted so as to cut in either a horizontal plane or a vertical plane. U.S. Pat. No. 2,632,990 (Stricken) discloses a single wheeled carriage device with a free standing and upstanding handle. The carriage has supporting shoes or skids 20 to maintain the carriage upright in the rest position. The device is able to cut either vertically or horizontally. When cutting horizontally, the cutter blade is able to be pivoted in a horizontal plane about a vertical axis on a cutter support arm. When cutting vertically the line of cut is substantially offset from the center line of the machine. A complex belt drive is required.

U.S. Pat. No. 2,618,919 (Hutchens) also discloses a single wheeled carriage arrangement with both a horizontally cutting trimmer blade 11 and a vertically cutting cutter blade 19. Each of these blades is able to be swivelled to a tilted position and independently operated so that simultaneous inclined cuts, or two simultaneous horizontal cuts are able to be achieved. This device is supported by a single wheel and a pair of short legs 31. The device has a conventional free standing and upstanding handle 29 which is presumed to be the then conventional T-shaped lawn-mower handle. Each cutting blade, in order to swivel, is mounted on an outrigger journal and is at a considerable horizontal distance from the wheel when the blade is in the vertical position. Except for the handle arrangement, the device is of very broad dimensions with the cutters extending a long way forward of the single wheel. This single wheel is placed approximately midway front to rear and approximately on the centerline of this carriage device to constitute both a front to rear and a left to right pivot point. However, the carriage has substantial masses located at some distance from the pivot or balance point. As a result, the device is unwieldly; being difficult to balance and therefore difficult to use.

In a follow-up invention, the same inventor in U.S. Pat. No. 2,719,398 discloses basically the same machine as previously but with only a single cutter rotating in a swivel tilted position or a vertical plane. Again, the cutter is mounted on a swivel outrigger journal which when the blade is vertically aligned is spaced sideways by a substantial horizontal distance from the wheel. This swivel arrangement of the cutter is necessary to enable any effective tilted cut to be achieved as the wide dimensions and low clearance of the frame of the carriage device prevent laterally tilted cutting action. As before with his earlier device, tilted cuts can only be achieved by swivelling the outrigger arm of the blade. For this reason a separate cutter blade tilt mechanism is provided to enable effective edging with the tilted blade, for example for edging against a wall. This single wheel device is again pushed by a conventional free standing and upstanding single shaft mower-type handle 20 which is again presumed to have a T-shaped upper end as was then conventional.

U.S. Pat. No. 2,478,813 (Esleck) also discloses a single wheel carriage device with a conventional free standing and upstanding T-shaped handle 7 with a pair of closely spaced hand grips 17. In this lawn edger the axes of the single supporting wheel 14 and the cutter blades 29 are aligned or coincident. Similarly, U.S. Pat. No. 2,707,859 (Walker) also discloses a device having a vertical cutting disc supported by a single wheel 12 and manipulated by a conventional handle 14 having a cross head handle 15 with two closely spaced handgrips. The wheel 12 is in front of the cutter.

Figure 5:
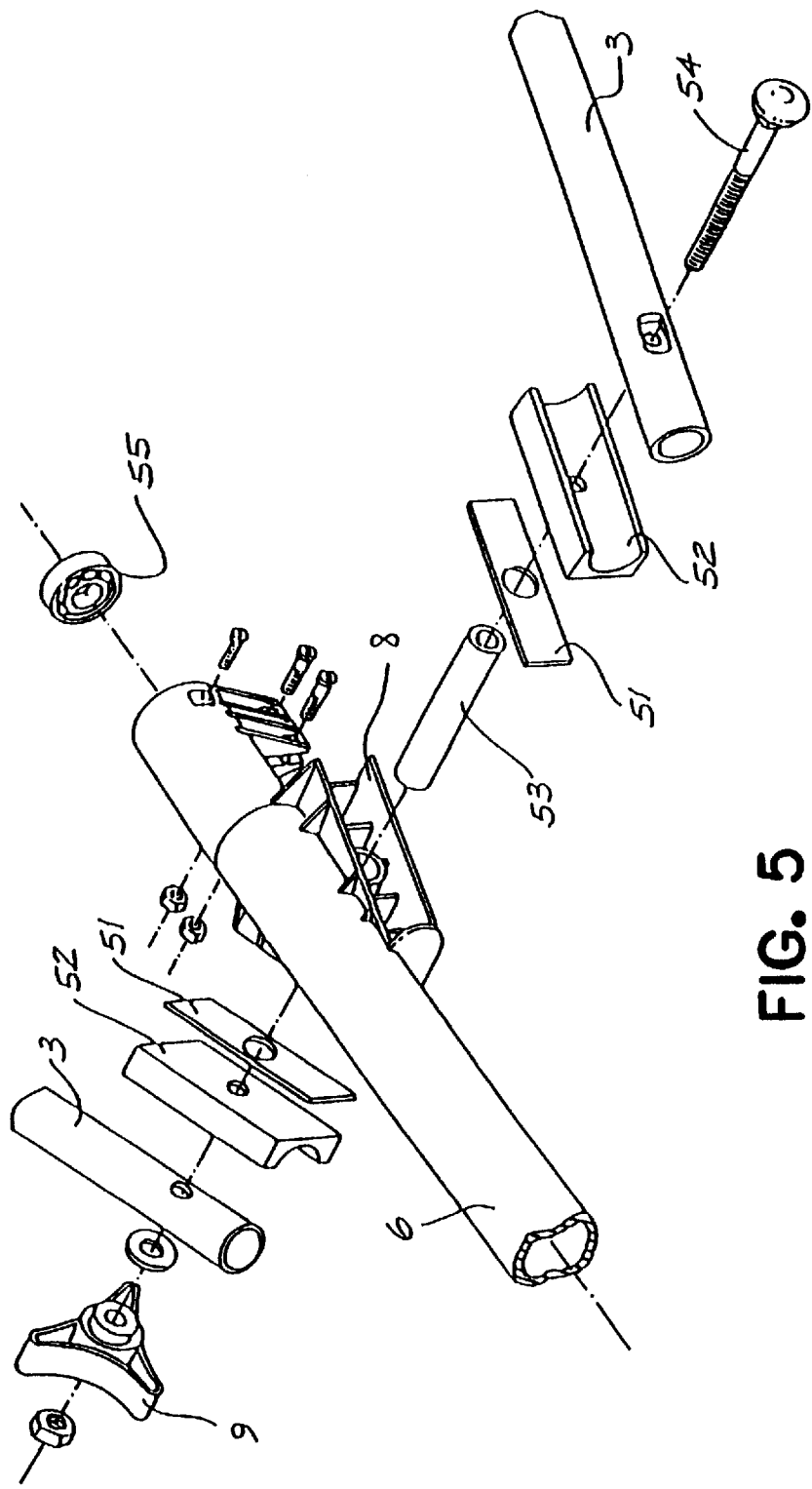

U.S. Pat. No. 2,708,335 (Newton) also discloses a single wheel device which in this instance is able to cut both horizontally and vertically. The single wheel supports the motor and cutter blade while cutting vertically. It is not clear how the device is supported during horizontal cutting as illustrated in FIG. 5. In this device the handle 27 consists of a single bent tube and therefore it would be necessary for the operator to keep a very firm grip on the handle in order to prevent the device twisting or tilting whilst cutting vertically. U.S. Pat. No. 2,653,381 (Rooke) discloses a similar device with a rod-like handle 27 which again has a single grip 43. A roller 36 supports the device whilst trimming vertically and the device appears to be supported by skids whilst cutting horizontally.

U.S. Pat. No. 4,033,098 (Green) discloses a device for cutting horizontally which has a single wheel 11 and a pair of spaced apart handles 33. As seen in FIG. 5, in order to cut grass adjacent a wall 42, it is necessary for the handles 23 to be released, then twisted to one side and then secured in that position in order that the operator's hand not be scraped during the passage along the wall 42. Furthermore, because the large motor 12 is mounted forwardly of the wheel 11, the center of gravity of the device is forward of the wheel 11. Therefore, in operation it is necessary for the handles 33 to be forced downwardly in order to maintain the correct cutting height. If, during operation, the handles 33 are inadvertently released, then the cutting elements 28 immediately impact with the ground, which is extremely dangerous.

Another single wheeled device in which the center of gravity is forward of the single wheel is that disclosed in Australian Patent No. 107,917 (Collins and Henderson). This device has a cutting disc 4 which normally rotates in a horizontal plane above a pair of skids 16 which assist to support the weight of the device. The weight of the cutting arrangement means that the center of gravity of the device is forward of the wheel 2, notwithstanding that the engine 3 is mounted above, but just behind, the wheel 2. Again, in operation it is necessary for the operator to push down on the handles 13 in order to relieve the weight on the skids 16.

U.S. Pat. No. 4,845,929 (Kawasaki) again discloses a device for cutting horizontally (rather than vertical edging) in which a pair of wheels is positioned inside a dome-shaped cutting disc. The wheels are pivotable about a vertical axis in order to permit cutting in different directions. In the second embodiment of FIGS. 19–23, the trimmer is supported by a pair of running wheels 8, and a skid 170 (column 12, line 37) but designated 156 In FIG. 20. This indicates that the center of gravity of the device is forward of the wheels 8 and therefore the guide handles 16 have to be depressed in order to operate the device.

U.S. Pat. No. 3,168,147 (Peters) discloses a single wheel carriage device with free standing and upstanding handles. The offset handles enable the operator to overcome the tendency of the out of balance device to tip laterally. The cutter blade 11 is on an outrigger journal which is offset to one side. The foot 24 stops both lateral tilting and rearward tilting. The apparatus is unstable and difficult to use especially considering the awkward situation of the operator. This is because of the geometry of the apparatus including the considerable horizontal distance between the wheel centerline and the cutter blade. Thus, it is impractical to try to laterally tilt the apparatus for a tilted cut. Further, the operator is required to simultaneously push and hold forward (against spring pressure) the pad 16. This holds down the pivoted journal arm for the blade, to set the blade's cutting position. As well as having to overcome the spring pressure, the operator also has to have enough thumb strength to stop the blade "bouncing" out of the ground. This applies particularly if the ground is hard, or worse still, if the blade hits a solid object.

U.S. Pat. No. 3,533,223 (Gunn) discloses a sand trap edger with floatable blade carrying arm supported by a second wheel. The cutter blade is a substantial horizontal distance from the wheel centerline and mounted in an outrigger fashion. U.S. Pat. No. 2,706,941 (Swanson) discloses a single wheel device but has the wheel forward of the cutter. The operator is said to walk backwards with base plate 10 sliding over the grass surface.

A further problem to be considered is the present and future mandatory safety requirements in some jurisdictions whereby it is, or will be, required that the blade of the lawn edger must come to a complete stop within a given time after the operator releases the engine throttle. This is similar to the present regulations applying to rotary lawn mowers in these jurisdictions. The specified amount of time varies from one jurisdiction to another but is typically as short a time as three seconds.

U.S. Pat. No. 4,984,417 (Braun et al) is an example of a (belt driven) lawn edger with a safety brake arrangement fitted.

As a consequence of this regulatory environment, lawn edgers which include this type of safety requirement of stopping or braking the blade within a given time, will have an additional cost in the cost of manufacturing such edgers.

Such edgers, especially those with belt drives, normally have a four-stroke engine with an output shaft speed in vicinity of 1500–2000 rpm which is approximately the same rotational speed desired for the cutter blade. As a consequence the gear ratio of the belt drive is typically in the range of from 1:1 to 1.25:1 and almost never exceeds 1.5:1.

The consequence of this gear ratio is that when the clutch mechanism is disengaged (whether there be a centrifugal clutch or a declutching brought about by loosening of the belt tension), the cutter blade can continue to rotate for a substantial time. This is because the only mechanism which operates to slow the cutter blade is either the inertia of the clutch part or the friction of the loosened belt. For this reason a separate brake arrangement is necessary if safe operation and compliance with short stopping times are to be achieved.

It is the object of the present invention to substantially overcome or ameliorate some of the above mentioned disadvantages and problems by the provision of a powered lawn edger which is steerable with both hands, able to be manoeuvred in substantially the same fashion as a wheel barrow, and able to be operated without tiring the operator. Therefore the edger has a negligible turning circle, is able to be tilted easily to either side and yet supports a substantial part of the weight of the powered device. In addition, the arrangement should enable weight (or downward force) to be concentrated at the cutter blade so as to improve stability.

In accordance with a first aspect of the present invention there is disclosed a powered lawn edger steerable by an operator with both hands in the manner of a wheelbarrow, said edger comprising:

an elongate frame having handle means adjacent one end thereof and a ground engaging wheel means having an axis of rotation adjacent the other end, said frame having a longitudinal axis;

a power unit located in front of the operator and carried by said frame intermediate said ground engaging wheel means and said handle means;

an enclosed power train interconnecting said power unit and a rotatable cutting device to rotate said rotatable cutting device, said rotatable cutting device being mounted for rotation in a substantially vertical plane in use, and being mounted adjacent said other end of said frame with its axis of rotation forward of said ground engaging wheel means axis of rotation;

said handle means comprising a pair of spaced apart handle grips;

said edger having a center of gravity which, in use, lies in a substantially vertical plane passing through said ground engaging wheel means, and said center of gravity also being intermediate said handle means and said ground engaging wheel means, whereby said handle grips can be manipulated to twist said frame about its longitudinal axis to laterally tilt said cutting device from said vertical plane of rotation.

In accordance with a second aspect of the present invention there is disclosed in a powered lawn edger having a frame, at least one ground engaging wheel means supporting the frame, a power unit carried by the frame, a cutting device rotatable by said power unit and height adjustment means to adjust the height of said cutting device relative to the ground, the improvement comprising a debris deflector carried with said wheel means, the height of said debris deflector relative to the ground being unchanged with operation of said height adjustment means.

In accordance with a third aspect of the present invention there is disclosed in a powered lawn edger having a frame, at least one ground engaging wheel means supporting said frame, a power unit carried by said frame, a throttle means to increase or decrease the speed of operation of said power unit, and a cutting device rotatable by said power unit, the improvement comprising a throttle interlock mechanism wherein said throttle is operable to increase the speed of said power unit above an idle speed only on immediately prior operation of said interlock mechanism.

In accordance with a fourth aspect of the present invention there is disclosed in a powered lawn edger having a frame, at least one ground engaging wheel means supporting the frame, a power unit carried by the frame, a cutting device rotatable by said power unit, and a transmission interconnecting said power unit and cutting device, the improvement comprising a gear reduction means included in said transmission and having a gear ratio in the range of from 1.5:1 to 8:1.

In accordance with a fifth aspect of the present invention there is disclosed a method of edging lawn alongside a formed edge of a path or roadway utilizing the edger of the first aspect, said method comprising the steps of:

energising said power unit to rotate said cutting device, holding said handle grips one in each of a corresponding hand, walking along said path or roadway whilst wheeling said ground engaging wheel means thereover, steering said edger as necessary to align or maintain aligned, said rotating cutter blade with the desired line of cut, and twisting said edger about the longitudinal axis of said elongate frame by adjusting the height of said handle grips relative to said formed edge as necessary to adjust the desired angle of cut.

Figure 2:
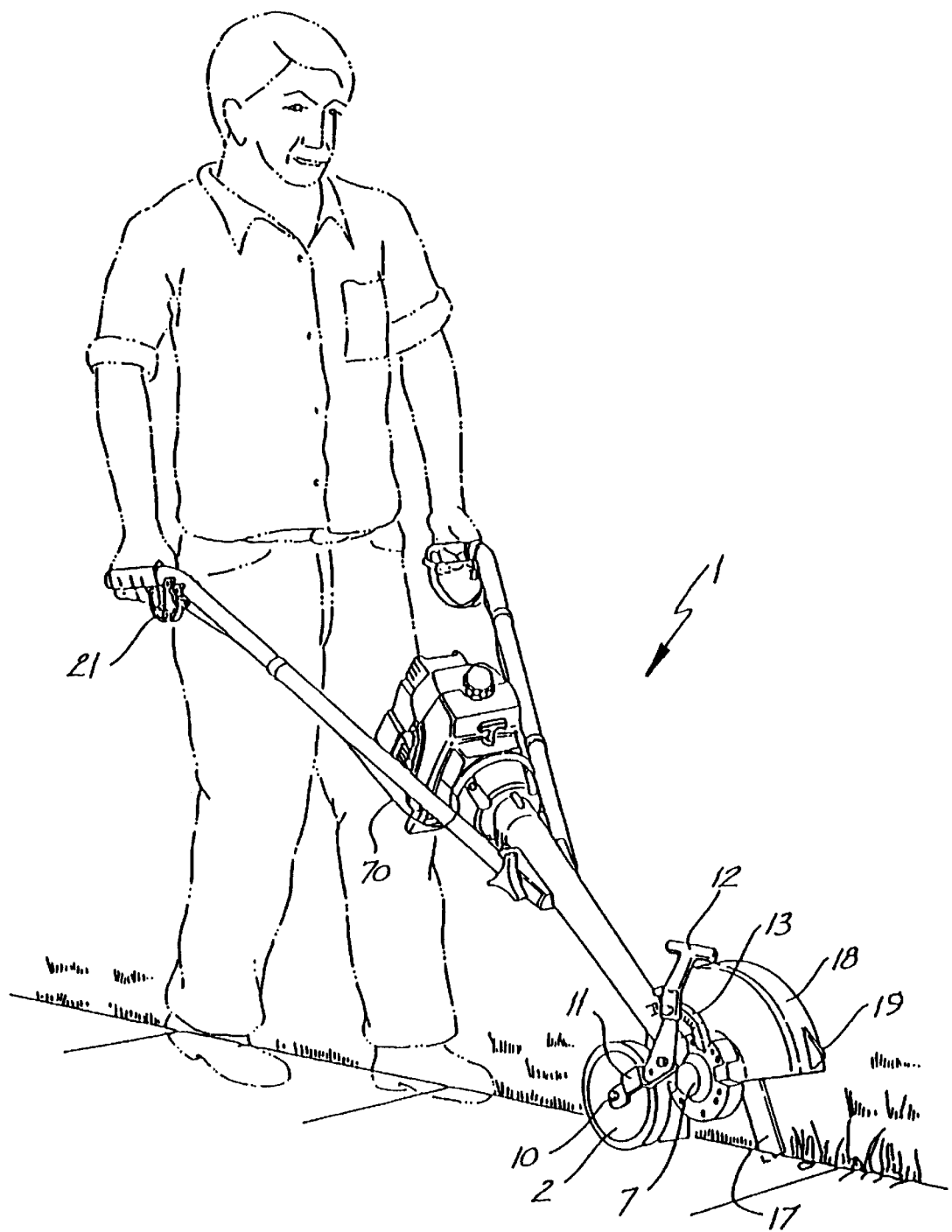
Figure 3:
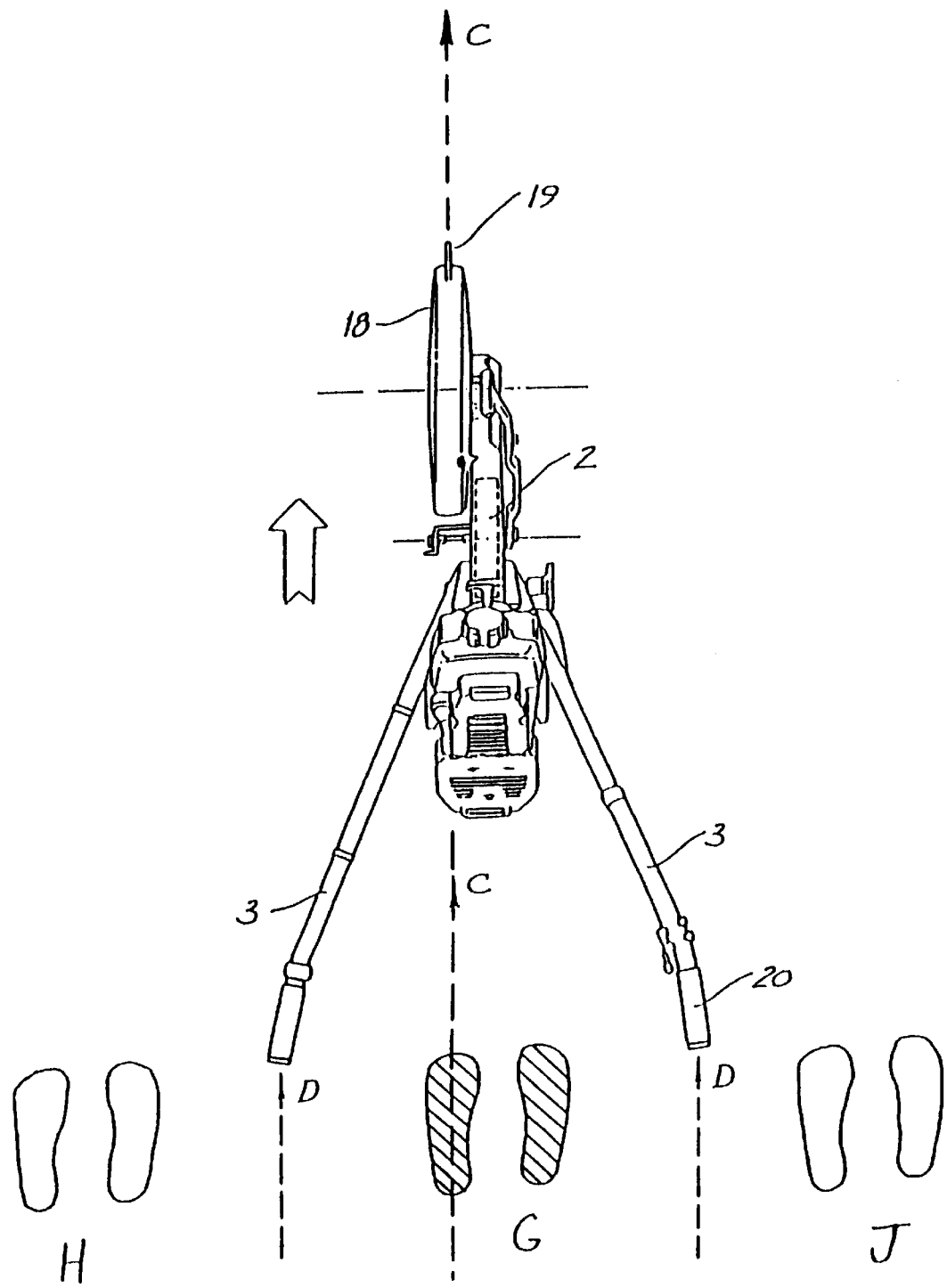
Figure 4:
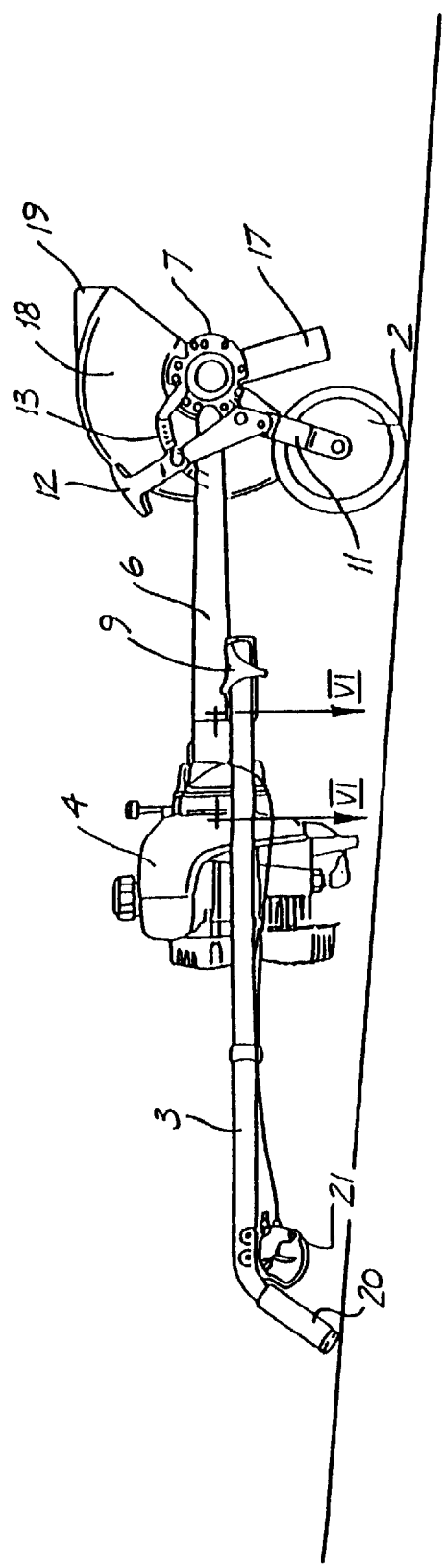
Figure 6:
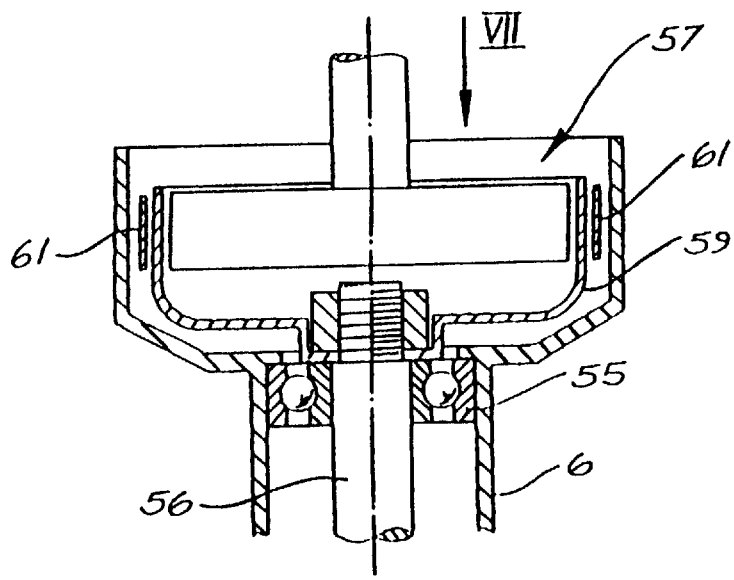
Figure 7:
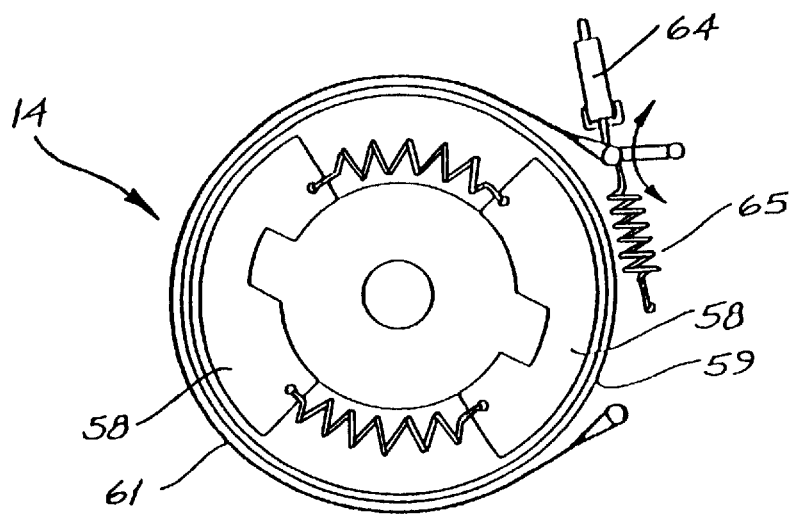
Figure 8:
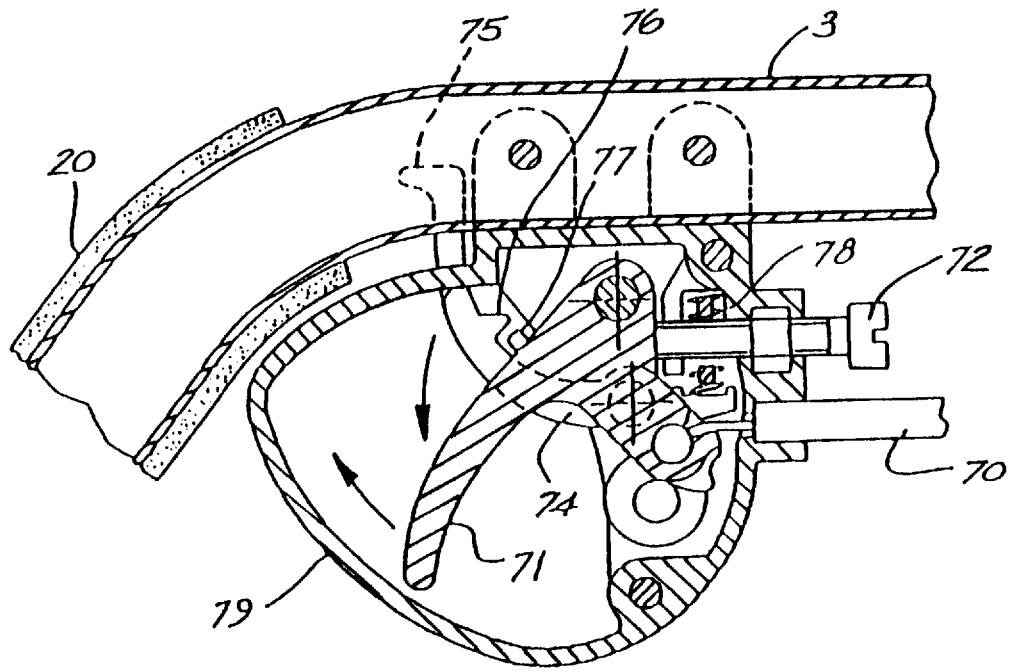
Figure 9:
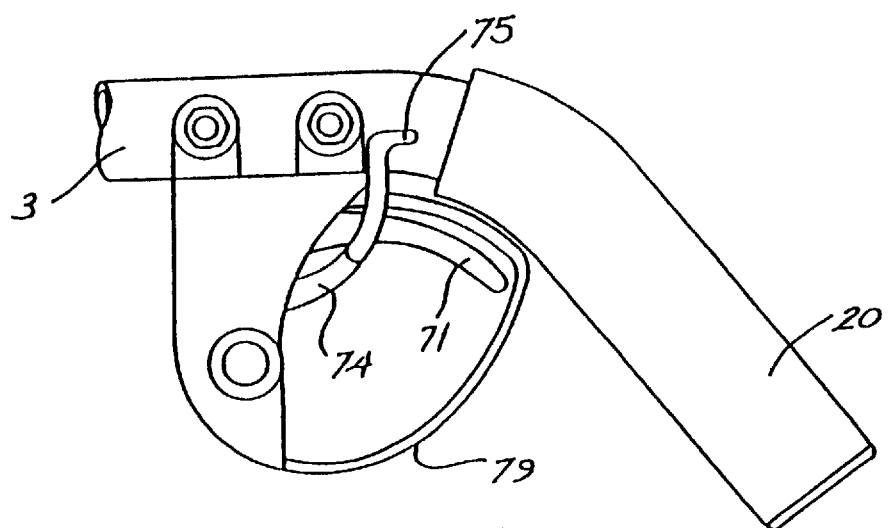
Figure 13:
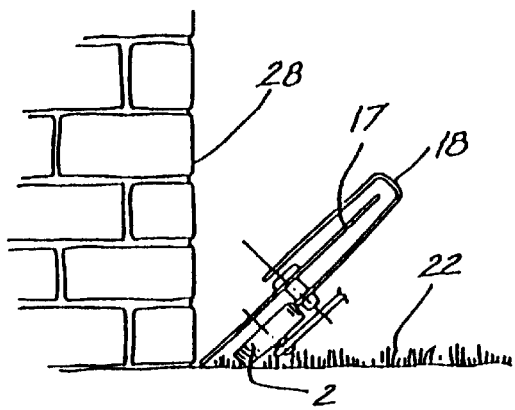
Figure 14:
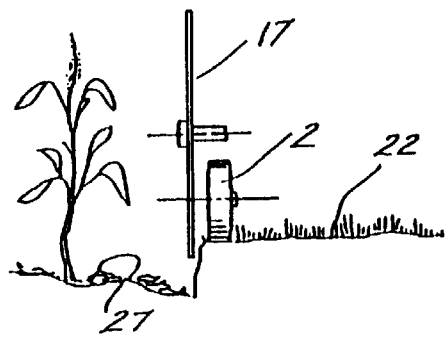
Figures 15, 16, 17:
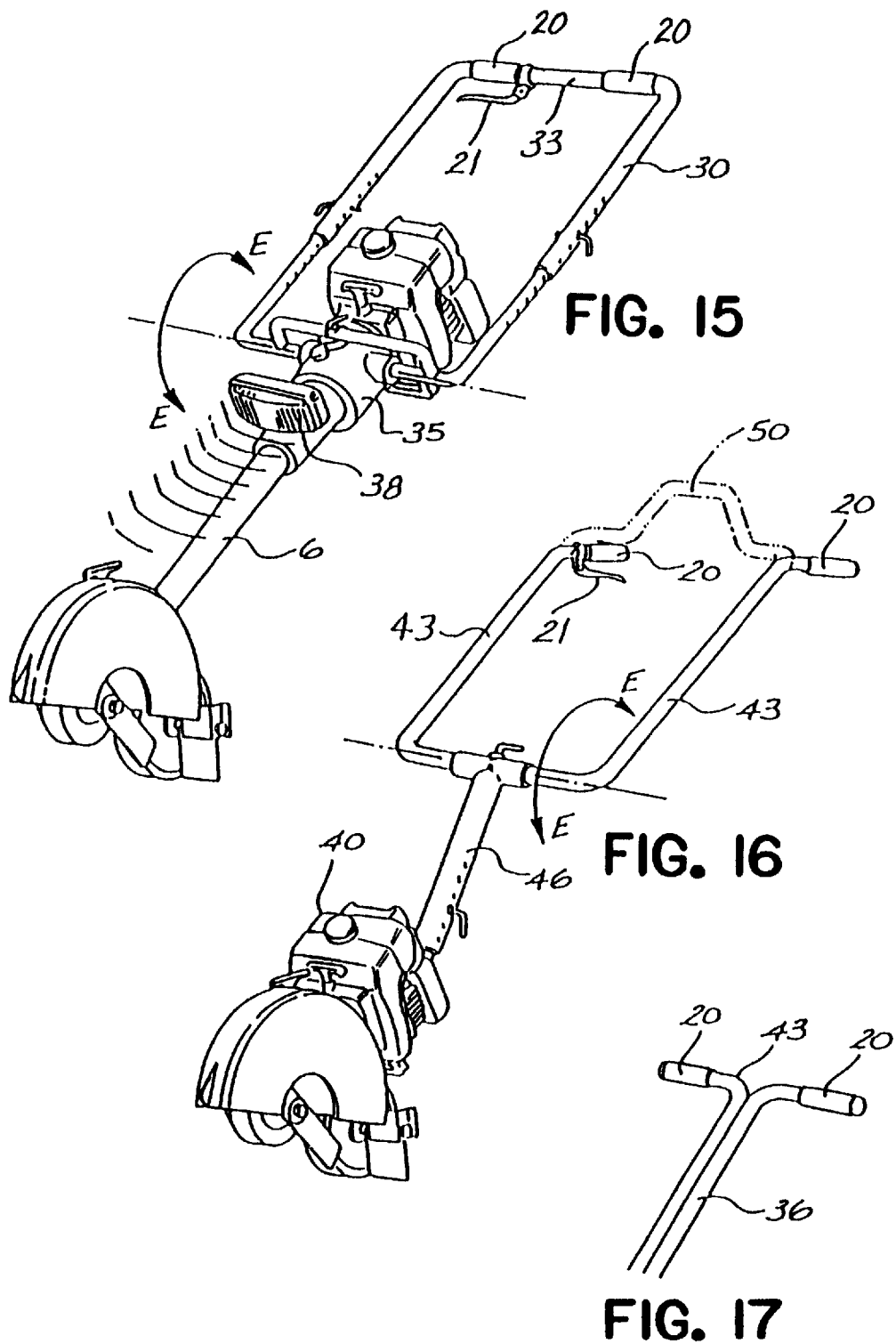
Figure 18:
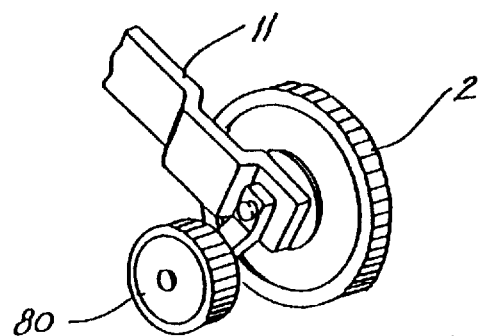
Figure 19:
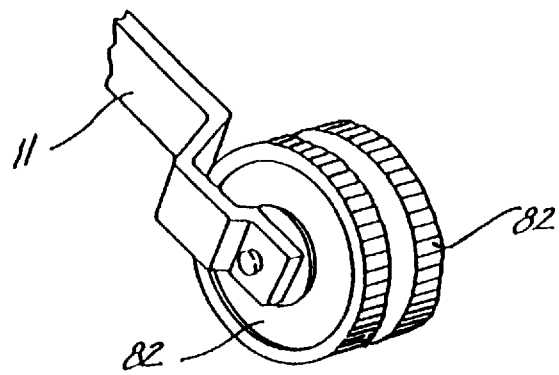
Figure 20:
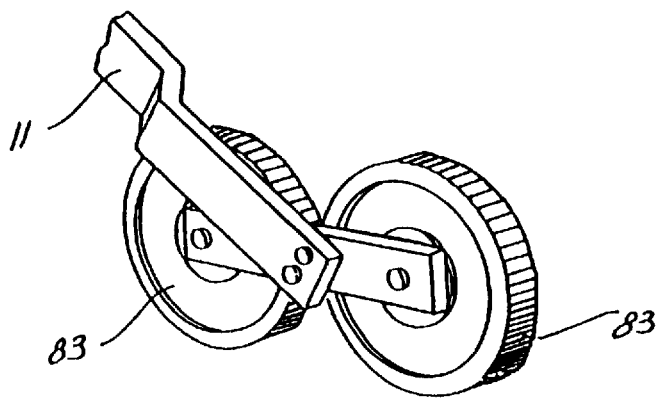

A preferred embodiment of the present invention will first be described and then a number of variations to that preferred embodiment will be described, the description being with reference to the accompanying drawings in which:

FIG. 1 is a front perspective view of the left hand side of the hand steerable powered edger of the preferred embodiment, FIG. 2 is a front perspective view of the right hand side of the edger of FIG. 1 in use, FIG. 3 is a schematic plan view of the edger of FIGS. 1 and 2 in use, FIG. 4 is a side view of the edger of FIGS. 1–3 in a stable non use position, FIG. 5 is an exploded perspective view showing a substantially vibration free mounting for the handles, FIG. 6 is a cross-sectional view through the clutch mechanism along the line VI—VI of FIG. 4, FIG. 7 is an end view of the clutch mechanism in the direction of arrow VII in FIG. 6, FIG. 8 is a longitudinal cross-sectional view through the throttle control, FIG. 9 is a side view of the throttle control but looking in the opposite direction to the view of FIG. 8, FIGS. 10–14 are schematic end elevations of the device of FIGS. 1–4 in use, FIGS. 15–17 illustrate three further embodiments having differing handles, and FIGS. 18–20 illustrate three different ground engaging wheel configurations.

As seen in FIGS. 1 and 2, the edger 1 of the preferred embodiment takes the form of a slender wheel barrow like device having a single ground engaging wheel 2 of appreciable diameter, a pair of handle bars or handles 3 with hand grips 20 and a power unit or motor 4, all arranged about a generally elongate narrow frame 5. The wheel 2 has a sufficiently large diameter to enable the edger 1 to be easily rolled like a wheelbarrow including rolling over steps, rough terrain, lawn, tangled grass, garden bed peripheries, etc. The wheel 2 is below the elongated frame 5 and preferably (as illustrated in FIG. 3) on, or close to, the longitudinal center line of the edger 1.

The motor 4 can be either an electric motor or any type of internal combustion engine. The motor 4 is positioned in front of the operator and is mounted at the head of the transmission frame 5 and is generally provided with a conventional speed dependent centrifugal clutch 57 (illustrated in FIG. 6). A drive shaft 56 (also illustrated in FIG. 6) passes through the hollow stem 6 of the frame 5 to a ninety degree reduction gear box 7.

The frame 5 also has two wedge shaped receptors 8 to which the handle bars 3 are releasably secured by means of a releasable handle 9. The frame 5 and handles 3 have a generally Y-shaped configuration. The handles 3 are preferably detachable so as to place the edger in a transport or storage configuration having a reduced overall length. The entire edger 1 is able to be easily placed in the boot or trunk of even a small motor vehicle.

Extending from the outer housing of the gear box 7 is a pivoted arm 11 (FIG. 2) on the free end of which the wheel 2 is rotatably mounted. The arm 11 is pivotal by means of a resilient height adjustment handle 12 which is biased so as to be able to be set by the operator and retained in a position setting in any one of a number of positions relative to a height setting plate 13 which includes a number of apertures.

Extending from the gear box 7 is a shaft 16 (FIG. 1) which carries an actuator in the form of a single cutter blade 17 which is shielded by a guard 18. On the leading end of the guard 18 is mounted a foresight 19. The cutter blade 17 and shaft 16 are a fixed distance from the engine 4.

The gear box 7 provides a gear reduction (between 1.5:1 and upto about 8:1) but preferably around 4:1 with an engine of, say, 30 cc capacity. Because of the low gear ratio the peripheral speed at the tips of the cutter blade 17 is kept low, even at engine speeds of upto 10,000 rpm if using, say, a 20 cc capacity engine. If a large capacity engine of, say, 50 cc capacity-is utilised, then that engine has more power and therefore can rotate the large blade 17 at slower engine speeds using a gear ratio in the vicinity of, say, 2:1 or even 1.5:1.

Because of the slower blade peripheral speed, a longer blade 17, which takes a longer time to wear out, is able to be used. The blade 17 is longer than those blades used on heavy duty carriage edgers, and is certainly much longer than the short blades used on light duty wheeled brush cutter type edgers and the light duty wheeled carriage class of edgers. A longer blade 17 also has the advantage of "pulling" the lightweight edger 1 along and thus makes the edger 1 self propelling to some extent at least.

It will be apparent to those skilled in the art that the handle 12 and plate 13 permit the height above the ground of the blade 17 to be adjusted for any given angle of inclination of the transmission frame 5 relative to the ground by the raising or lowering of the gear box 7. Thus, although the operator is able to raise or lower the handles 3 and thereby tilt the transmission frame 5 in a small arc within a vertical plane about the point of engagement of the wheel 2 with the ground, this adjustment is small. The fundamental height setting is adjusted by the height adjustment mechanism in the form of the arm 11, handle 12 and plate 13. This enables the height to be set by each operator. This setting is used to determine the depth of cut by the blade 17 into the lawn and/or soil surface. This adjustment also allows for compensation for the shorter length of a worn blade 17 and/or the different heights and/or arm lengths of different operators. Also the step-by-step height adjustment cannot change during use as do sliding adjustments which rely upon friction to clamp the slide in position.

In addition, the extended stub axle 10 carried on the free end of the arm 11, and about which the wheel 2 rotates, carries a debris deflector 15. Unlike the cutter guard 18 which is raised or lowered with the height adjustment mechanism 12 and 13, the debris deflector 15 remains at a constant height relative to the ground surface. Preferably the debris deflector 15 is rigid and is able to pivot about the axle 10 (for example to swing over lumps of tangled grass) and hangs down in the position illustrated in FIG. 1 under the influence of its own weight. The lower edge of the debris deflector 15 reaches ground level, or near to ground level. If desired, a spring (or equivalent conventional mechanism not illustrated) can be used to urge the deflector 15 back into its substantially vertical rest position. Thus the debris deflector 15 is always at a constant height and/or position relative to the ground surface, regardless of the height adjustment set by the handle 12. This is to be contrasted with prior art rubber flaps which hang from guards for cutter blades and thus move with the height adjustment mechanism being raised, or drag severely on the ground when lowered. The debris deflector 15 functions to protect the operator from flying stones or debris that can pass below the cutter blade guard 18 as the cutter blade rotates in the direction of arrow A in FIG. 1. Alternatively a flexible debris deflector flap can be used, with one end of the flap affixed in any conventional way to the wheel stub axle 10.

Both the debris deflector 15 and guard 18 stop the ascent of dust, grit, grass cuttings and other flying debris thrown up by the cutter blade 17. As a consequence, the operation of the edger 1 is not only rendered more safe for the operator, but dust is less likely to enter into the engine or motor 4 thereby prolonging engine life.

As indicated in FIG. 1, the engine 4 has a throttle control 21 and, if desired, a brake 14 which is connected via a cable to the engine 4. The brake 14 is released by grasping the brake lever 26 against the corresponding handle grip 20.

Turning now to FIG. 5, the detail of an anti-vibration mounting for the handles 3 is illustrated. The stem 6 is provided with two moulded plastic wedge shaped receptors 8. A steel skin 51 is positioned between each receptor 8 and a corresponding U-shaped rubber channel 52 into which the handles 3 are recevied. A rubber sleeve 53 passes through the stem 6, receptors 8 and skins 51. A bolt 54 passes through the handles 3, channels 52, skins 51 and sleeve 53 and is able to function as a clamp by tightening of handle 9 into which the bolt 54 is received.

As also seen in both FIG. 5 and 6, the upper end of the stem 6 carries a bearing 55 for a, preferably solid, transmission shaft 56 which interconnects a centrifugal clutch 57 with the gear box 7 (FIG. 2). The clutch 57 has a substantially conventional pair of spring loaded shoes 58 (FIG. 7) which under the influence of centrifugal force when rotating engage the clutch drum 59. This engagement transmits power from the engine 4 to the shaft 56. Preferably a brake 14 in the form of a brake band 61 which extends around the clutch drum 59, is provided. The brake band 61 is connected to the brake lever 26 (FIG. 1) by means of a cable 64.

The brake 14 is biassed on by means of a spring 65 which pulls the brake band 61 into engagement with the exterior of the clutch drum 59. The brake 14 is released by grasping the brake lever 26 against the adjacent handle grip 20. This pulls the cable 64 against the spring 65 thereby freeing the brake band 61 as illustrated in FIGS. 6 and 7.

The details of the throttle control (which is right handed) are illustrated in FIGS. 8 and 9. The throttle of the engine is controlled by a cable 70 which is able to be pulled by rotating a throttle trigger 71 clockwise as seen in FIG. 8. The idle speed is controlled by setting screw 72.

However, before the throttle trigger can be moved to increase engine speed above idling, an interlock lever 74 must be momentarily moved in an anticlockwise direction as seen in FIG. 8. This movement is brought about by the operator's right thumb which engages the free end 75 of the interlock lever 74.

The interlock lever 74 is provided with a lug 76 which, in the rest position of the interlock lever 75, engages a similar protrusion 77 on the throttle trigger 71, thereby preventing movement of the throttle trigger 71. As a consequence, the operator must first depress the interlock lever 75 with his right thumb before being able to pivot the throttle trigger with his right index finger. Once the throttle trigger moves away from its idle position, a return spring 78 resets the interlock lever 74 into its initial position. This is the position illustrated in FIG. 9. Thus the trigger 71 can be moved to increase or decrease engine speed so long as the engine 4 is not idled. If the trigger 71 is returned to the idle position, then the lug 76 and protrusion 77 are re-engaged. As a result, the engine speed cannot be increased again without the interlock lever 74 being depressed. The throttle control 21 also has a stirrup guard 79 to prevent the trigger 71 being bumped whilst the engine 4 is operating. Clearly, for a left hand throttle, the interlock lever 74 should be placed on the opposite side of the throttle trigger 71 so as to be accessible by the left thumb.

It will be apparent to those skilled in the art from FIGS. 2 and 3, in particular, that the edger 1 of the preferred embodiment is mechanically similar to a slender wheel barrow, in that the center of gravity of the edger 1 is positioned in a substantially vertical plane located between the handles 3, and is also positioned between the wheel 2 and the handles 3. As a consequence of this arrangement, the greater part of the weight of the edger 1 is borne by the wheel 2 and only a small part is supported by the operator. In addition, in operation the edger 1 is subjected to forces at only three locations, the wheel 2 and both handles 3. This makes for a very stable arrangement.

Furthermore, because the shaft of the cutter blade 17 is a very short radial distance from the shaft of the wheel, even though the edger 1 is light in terms of its overall weight, the leverage between the cutter blade 17 and the wheel 2 is very substantial. This prevents blade bounce and furthermore improves the stability of the edger 1 in operation.

However, the edger 1 of the preferred embodiment differs from a conventional wheelbarrow in relation to the position of the center of gravity relative to the frame of the edger. In a conventional wheelbarrow, especially one carrying a heavy load such as wet concrete, the center of gravity is above the frame. Thus if one handle is lowered, and/or the other raised, an inherently unstable position is quickly reached and the operator may be unable to prevent the load spilling out sideways as the wheelbarrow rotates about its longitudinal axis.

This is to be contrasted with the above described embodiment, where the center of gravity (determined to a certain extent by the position of the engine 4) lies on, or close to, the longitudinal axis of the frame 5. This has the result that the mass is basically concentrated along the longitudinal axis of the frame and only the handles diverge from this axis to any considerable extent. Thus the handle grips 20 can be comfortably moved laterally in a fully controlled arc about the longitudinal axis of the frame 5 without the edger 1 becoming unstable in any way. This makes for particularly easy tilting of the edger 1 in order to quickly and precisely tilt the cutter blade 17 into any desired cutting angle by any operator and without any difficulty.

Because of the slender wheelbarrow-like configuration of the edger 1, like a wheel barrow the edger 1 has no minimum turning circle and can be turned through 360° on a spot. The edger 1 can also be steered by moving the handles 3 to left or right about a vertical axis passing through the wheel 2. In operation, by lifting one of the handles 3 and/or lowering the other handle, the handles 3 are thereby easily twisted about the longitudinal axis of the stem 6. This lateral tilting or twisting action through a short arc moves the plane in which the cutter blade 17 rotates from the vertical as indicated by the arrows B in FIG. 1. This movement is able to be achieved quickly and easily by the operator in response to changing conditions, any obstacle, etc. The closer the blade 17 to the longitudinal axis of the edger, the easier the movement of the handle grips 20 in order to achieve a given effective tilt of the cutter blade 17.

As indicated in FIGS. 2 and 3, as the operator normally is positioned directly behind the edger 1 (indicated as position G in FIG. 3), and operates by walking in a natural stance forward along the line of cut indicated by arrows C in FIGS. 1 and 3. This natural stance enables the operator to work for long periods without tiring. Since the operator is not stooped, and has a straight back, the operator can work without fear that serious back injury may eventually occur.

It will be apparent to those skilled in the art that as the operator walks along in a straight line path, the plane in which the cutter blade 17 rotates lies within the distance between the shoulders of the operator as the operator moves along the path C. Considered another way, each shoulder of the operator thus traces out a locus or path indicated by arrows D in FIG. 3 to either side of the cutter blade 17.

From FIG. 2 it is also apparent to those skilled in the art, that the cutter blade 17 and guard 18, being located close to the ground, can be extended underneath low lying bushes without difficulty and without other parts of the edger 1 striking the bushes.

Also because the edger 1 is light and well balanced, the operator can be comfortably positioned to either side of both handles for any reason, for example, to allow the edger to edge under overhanging bushes or trees where a directly following operator cannot follow. Alternatively, the operator being positioned to one side (or the other) of the handles is able to manoeuvre the edger around the perimeter of small irregular shaped flower beds, or to side step around obstacles such as a small bush, water tap, garden hose reel, mud puddle, or any other obstacle.

Therefore it is not necessary for the operator to always be positioned directly behind the edger, even if the edger moves along the straight "line of cut" C. Thus the operator can easily and quickly "side step" from one extreme on one side of both handles (position H in FIG. 3) through to the other extreme on the other side of both handles (position J in FIG. 3). This change in operator position can be carried out wherever it is necessary without altering or adjusting hand positions of the operator. That is, the position of the arms and body changes relative to the substantially unchanged position of the hands and edger. Thus the operator retains a full and comfortable control of the edger at all times.

Conversely, the "foot prints" marked H and J in FIG. 3 can also illustrate either one of two new positions into which an operator can move and also move the edger so that it resumes its position directly in front of the operator. This change in position naturally results in a change in direction of the "line of cut" C.

This unique separate and/or combined operator/edger flexibility can be carried out without any strain or bother to the operator and without tiring the operator.

The narrow profile of the front of the edger 1 also allows same to work into narrow confines of space, for example where a post or other structure is positioned close to a curb or path. This is impossible for typical 3 (or 4) wheeled carriage type edgers or prior art single wheeled carriage devices.

Further, as best appreciated from FIG. 3, the foresight 19 enables the operator to accurately guide the edger along the edge of the curb or path.

If the motor 4 is an internal combustion engine, then in order to start the engine, the handles 3 (or handle grips 20 if provided) can be rested on the ground as illustrated in FIG. 4. As a consequence, the edger 1 is positioned in a very stable and secure position, coming into contact with the ground only in three positions, namely the tips of each of the handles 3 (or handle grips 20) and the bottom of the wheel 2. In this position the cutter blade 17 is clear of the ground.

With the edger 1 in this stable position, the operator is able to pull the starting cord of the internal combustion engine 4 whilst being well away from the cutter blade 17 but adjacent the throttle control 21. As a consequence, if not braked against rotation as explained above, any spinning of the cutter blade 17 which may occur because of higher revolutions of the internal combustion engine at the time of starting, occurs with the operator safely positioned well away from the rotating cutter blade 17. After starting, the engine is idled and the automatic centrifugal clutch 57 then disengages the cutter blade 17 from the engine 4. The throttle trigger guard 79 prevents the throttle control 21 being inadvertently depressed by coming into contact with a bump or other object above the ground during starting.

The throttle trigger 71 also has a safety interlock as explained above in relation to FIGS. 8 and 9, so that on idling, any accidental movement of the throttle trigger cannot occur, an operator's hand has to be holding the mechanism to operate same.

Of course, if the motor 4 is an electric motor, the throttle trigger with safety interlock then controls an electric on-off switch inside the motor housing and can be easily manipulated in the operating position. An electric motor can be either a mains operated AC or DC motor or a battery pack operated DC motor.

As an alternative to the preferred two handles 3 resting on the ground, a ground contacting leg stand (not illustrated), either fixed or retractable, can also be used when the edger 1 is at rest.

It is especially desirable for electric motors that the above described brake 14 be provided. This is because internal combustion engines have compression which quickly slows same after the throttle is released or returned to idle. However, electric motors have substantial inertia and no equivalent braking action. For this reason they continue to rotate for much longer periods of time after the power is switched off. For this reason the brake 14 is very desirable for electric motors. On release of the brake lever 26 by the operator, for any reason, the brake band 61 locks tight around the clutch drum 59 causing the blade 17 to quickly stop rotating.

A preferred feature which enables the expense of the brake 14 and all its associated components to be eliminated arises out of the combination of an internal combustion engine 4, centrifugal clutch 57 and gear box 7. This arises as follows. The internal combustion engine 4 itself quickly stops rotating if the throttle is released or returned to idle because of the compression of the engine 4. This means that the clutch shoes 58 quickly retract leaving the clutch drum 59 to free wheel. However, since the clutch drum 59 and shaft 56 are connected to the cutter blade 17 via the gear box 7, all these items rotate together.

Because of the gear ratio (1.5:1 to 8:1) between the cutter blade 17 and clutch drum 59 the inertia of the cutter blade 17 acts to drive via the gear box 7, the shaft 56 and clutch drum 59. In this way the rotational energy of the cutter blade 17 is quickly dissipated and the cutter blade 17 quickly stops rotating.

This result arises because of the frictional losses in the overall transmission and because of the inertia of the shaft, gears and clutch drum. Since these three items must be rotated at a higher speed than the cutter blade 17 because of the gear ratio, and the driving force is the momentum of the cutter blade 17, the cutter blade 17 quickly stops rotating. Practical experiments with a gear box having a less than 4:1 reduction, indicate that a 30 cc two-stroke engine running at full speed (7,500 rpm) will result in the cutter blade ceasing rotation in approximately 2.5 seconds after the engine throttle is released by the operator. This is well within the 3 second period specified in some jurisdictions and within which the blades of rotory lawnmowers must stop rotating. The regulations, or prespective regulations, can still be complied-with but the expense of the brake is eliminated since the arrangement is inherently self-braking.

Irrespective of whether a brake for the cutter blade 17 is provided or not, the operation of the edger 1 is as follows. With the engine idling, the operator lifts both handles 3 in order to hold same with the arms relatively straight and extending directly towards the ground as illustrated in FIG. 2. The throttle control 21 can then be actuated to increase engine speed. The edger 1 is then wheeled along the path indicated by arrows C in FIGS. 1 and 3 to commence the edging operation. It will be apparent from FIG. 3, in particular, that the cutter blade 17 is located in a plane which passes between the handles 3 and that the operator walks along a trodden path or line which passes substantially over the "line of cut" unless the edger 1 is deliberately tilted or longitudinally turned to alter course.

Figure 10:
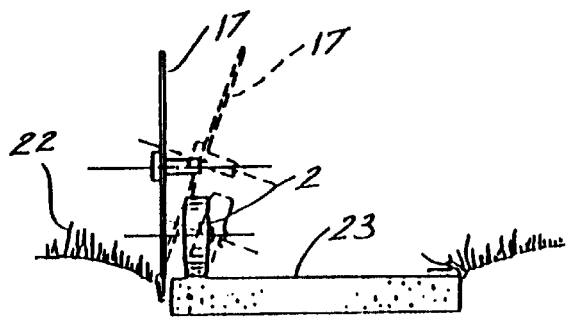

Several of the operational advantages of the edger 1 of the preferred embodiment are illustrated with respect to FIGS. 10–14. In FIG. 10, the edger 1 is being used to edge the lawn 22 growing at the left side of a path 23. As indicated in FIG. 10 the wheel 2 is moved along the left edge of the path 23 adjacent the lawn 22 and the rotating cutter blade 17 provides the necessary edging action. The first advantage is that the cutter blade 17 can be easily and quickly tilted out of a vertical plane by twisting the frame about its longitudinal axis in order to provide a tilted cut, an adjustment to the cutting action, to miss any obstacle, to provide a closer or more distant cut, and so on.

Figure 11:
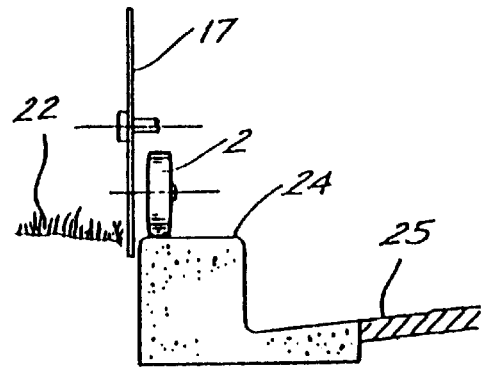

FIG. 11 illustrates a second advantage able to be obtained by the edger 1 of the preferred embodiment over a conventional carriage supported lawn edger. Here the wheel 2 is being easily moved along the upper edge of a formed concrete curb 24 of a gutter at the edge of a road 25. Again the cutter blade 17 edges the lawn 22. However, the prior art carriage devices are unable to be wheeled along the top of the curb 24 since the three (or four) wheels cannot be accommodated on the narrow upper surface of the curb 24 because of the side to side spacing between the wheels. This problem also occurs with the prior art single wheel carriage devices due to their cutters being located a substantial sideways distance from the wheel, generally on an outrigger device of some kind. Such carriages (irrespective of whether they have single or multiple wheels) can only be pushed (in the opposite direction) along the relatively rough grass. This is an onerous task-especially when long distances are involved such as arises with the edging of nature strips or verges alongside roads.

Figure 12:
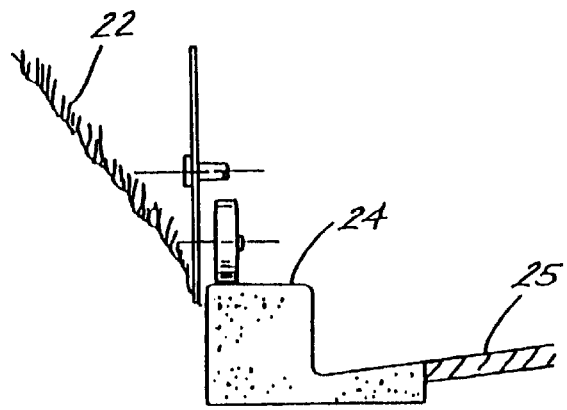

FIG. 12 illustrates an analogous situation to that of FIG. 11, but illustrates the procedure where the lawn 22 slopes towards the curb 24. Under these circumstances, the wheel 2 can again be accommodated on the narrow top of the curb 24. However, with the prior art carriage devices having to be wheeled on the grass, the grass slope of the lawn 22 would have the effect of tilting the entire apparatus and therefore moving the cutting device of that prior art apparatus out of the vertical plane to a substantial extent. Also when pushing forward such a prior art carriage edger, the carriage tends to continuously slide down the slope and this tendency has to be continually resisted by the operator providing an upward force component. This is both tiring as the operator has to adopt a "crab-like" or twisting motion and possibly walk in the gutter where parked vehicles can obstruct his path. It is also very dangerous as on a busy suburban road with moving traffic close to the curb, the operator runs a substantial risk of being struck by a passing vehicle.

As seen in FIG. 13, the edger can be operated so as to edge grass or lawn 22 growing up against a vertical surface such as a wall 26. Here by laterally tilting the handles 3 and therefore the wheel 2, the cutter blade 17 is easily moved out of a vertical plane and so both simultaneously inclined and brought to bear adjacent the base of the wall 28 with a fast, simple, comfortable and easy movement requiring no physical effort. This is much more convenient when compared with the slower and more difficult blade tilting arrangement on those edgers that have a swivel arrangement for blade tilting arrangement.

In FIG. 14 the use of the edger 1 to trim the side of a garden bed 27 (or golf bunker) is illustrated. Here the wheel 2 rolls over the relatively rough lawn 22 with ease whilst the cutter blade 17 cuts the desired edge to a level well below the grass surface. The wheel 2 is able to follow any irregularity in the ground surface in a way which a carriage device of three (or four) wheels cannot replicate since the carriage effectively "averages" the position of all wheels and thus "bounces" over irregularities.

It will be appreciated by those skilled in the art that the configuration of the edger 1 is inherently safe. In the event that the operator should stumble, the safety brake 14 and/or throttle control 21 is/are released, so the centrifugal clutch 57 disengages the cutter blade 17. This enables the edger 1 to roll forward and the handles 3 to drop to the ground. The safety interlock 74 on the throttle trigger 71 ensures that the throttle cannot be re-accelerated. This is a relatively safe situation with the cutter blade 17 safely raising out of, and above, the ground while it is quickly stopped and without the possibility of the blade dislodging debris towards the operator, or possibly dragging the apparatus forward against some other object or person etc.

Similarly, if the operator should fall over rearwardly for some reason such as tripping or slipping, then because the cutter blade 17 is the part furthest from the operator, and also because the wheel 2 is between the operator and the cutter blade 17, any rearward movement of the edger 1 is blocked by the wheel 2 coming into contact with the operator before the cutter blade 17 can strike the operator.

Turning now to FIG. 15, an alternative form of frame and handle 30 is illustrated. Rather than a Y-shaped frame 5 with two separate handles 3 as in FIGS. 1–4, in the embodiment of FIG. 15 the frame 35 is generally T-shaped and the handle 30 takes the form of a generally rectangular structure which is both of adjustable length and pivotable in the direction indicated by arrows E by movement of the cross member 33 relative to the stem 6.

FIG. 15 also illustrates a forward facing flashing or blinking light 38. The light 38 can be energised via either a battery (not illustrated) or the magneto of the engine 4. The light 38 is arranged to flash on and off automatically whilst the engine is operating. This assists in the safety of those government employees on busy and/or narrow roads.

Similarly, FIG. 16 illustrates another embodiment in which the motor 40 is mounted adjacent the wheel 2 but with its center of gravity either above the wheel 2 or towards the handles 43 but close to the wheel 2. In this configuration less of the weight of the motor 40 is carried by the operator but the center of gravity of the edger 1 as a whole still remains located not only substantially centrally between the handles 43 so as to be in line with the wheel 2, but also between the wheel 2 and the handles 43. However, the motor 40 is closer to any dust generated by the lawn edge trimming. As a consequence, this configuration does not have the dust reducing advantage of the configuration of FIG. 1, and generally requires that an additional air filter be used for an internal combustion engine. However, this configuration can be of advantage where an electric motor is used. It is also be possible to have a small lightweight electric motor in front of the wheel 2, directly or indirectly connected to the blade 17, but the center of gravity is still between the wheel 2 and handle grips 20 because of the length of the stem 46 and handles 43.

Also illustrated in FIG. 16 is an alternative U or C-shaped arrangement for the handles 43. Also in this embodiment an alternative stem 46 is provided which is adjustable in length. The handles 43 are adjustable in height. As indicated in FIG. 16, either a pair of handles 43 can be utilised, or a single handle 50 in the form of a hollow, substantially rectangular frame (as illustrated by broken lines). In a further variation, only one of the handles 43 can be provided but extended at the top to allow both handle grips 20 to be present. This is therefore a different C-shaped arrangement. In FIG. 17 a generally T-shaped handle stem 36 is illustrated. If desired, this can be made with a single rather than a dual stem.

In order to better edge in some difficult terrains such as a moderately steep grassed slope leading upto a retaining wall or fence, modified wheel arrangements can be advantageous. For example, as illustrated in FIG. 18 the wheel 2 can be provided with a pair of outrigger wheels 80 one to either side in the manner of "training wheels" used by young cyclists. Only one of the outrigger wheels 80 is illustrated in FIG. 18. Alternatively, as illustrated in FIG. 19, two narrow wheels 82 side-by-side but spaced slightly apart on the same axle can be used instead of wheel 2 to give improved "biting in" of the narrow wheel rims into soft soil on steeply sloping grass surfaces. Thirdly, as illustrated in FIG. 20, two in-line wheels 83 with a narrow gap between their co-planar rims can be used since these follow the intended route but provide additional traction.

The foregoing describes only some embodiments of the present invention and modifications, obvious to those skilled in the art, can be made thereto without departing from the scope of the present invention. For example, the cutter blade 17 can be replaced by a cutter disc or a nylon like filament. In addition, although the device of the present invention has been described in relation to lawn edging, the device also finds application in aerating lawns. In this application, a series of grooves are cut in a lawn in a criss-cross or cross-hatched pattern in order to provide the aeration effect.

Various modifications can be made to the present invention without departing from the apparent scope hereof.

We claim:

1. A powered lawn edger steerable by a walking operator in the manner of a wheelbarrow, the edger comprising:
   a. an elongated frame having handle means attached thereto adjacent one end thereof and having a ground engaging wheel means attached thereto adjacent the other end thereof, said ground engaging wheel means being below said frame with substantially the entire ground engaging wheel means lying below said frame;
   b. a cutting device mounted adjacent said other end of said frame forward of said ground engaging wheel means, said cutting device being rotatable about a horizontal axis;

c. height adjustment means connected to said frame for increasing the height or decreasing the height of said frame relative to the ground;

d. a power unit mounted on said frame;

e. an enclosed power train interconnecting said power unit and said cutting device for rotating said cutting device; and f. said ground engaging wheel means, said cutting device, said power unit, and said power train being positioned on said frame such that the center of gravity of the entire edger, in use, lies within a substantially vertical plane intermediate said ground engaging wheel means and said handle means and passing through said ground engaging wheel means, whereby said handle means can be manipulated by the operator to twist said frame about a longitudinal axis to laterally tilt said cutting device from its vertical plane of rotation.

2. An edger as claimed in claim 1, wherein said height adjustment means comprises an adjustment handle resiliently biased toward a setting plate, and wherein said adjustment handle and said setting plate are releasably engageable at a plurality of engaged positions, the height being adjustable to any of a plurality of predetermined heights each corresponding to one of said plurality of engaged positions.

3. An edger as claimed in claim 1, including a debris deflector supported by an axle about which said ground engaging wheel means rotates, the height of said debris deflector relative to the ground remaining unchanged with the operation of said height adjustment means.

4. An edger as claimed in claim 1, wherein said power train includes a transmission including gear reduction, wherein the gear ratio between said power unit and said cutting device is from 1.5:1 to 8:1.

5. An edger as claimed in claim 4, including a gear box having an output shaft and an input shaft and wherein said cutting device is mounted on said output shaft of said gear box, said output shaft being at any angle, preferably approximately 90°, relative to said gear box input shaft, and said output shaft is a fixed distance from said power unit.

6. An edger as claimed in claim 1, wherein said frame has a generally Y-shaped configuration.

7. An edger as claimed in claim 1, wherein said handle means are generally C-shaped in configuration.

8. An edger as claimed in claim 1, wherein said handle means are adjustable relative to said frame.

9. An edger as claimed in claim 1, wherein said power unit has a throttle means to control the speed thereof and said throttle means has an interlock mechanism wherein said throttle means is operable to increase the speed of said power unit above an idle speed only on immediately prior operation of said interlock mechanism.

10. An edger as claimed in claim 9, wherein said throttle means comprises a pivotable throttle trigger and said interlock mechanism comprises a pivotable interlock lever which in a rest position blocks movement of said throttle trigger in a speed increasing direction, said interlock lever being pivotable out of its rest position to permit said throttle trigger to be moved in a speed increasing direction.

11. An edger as claimed in claim 10, wherein said throttle means includes a stirrup guard to protect said throttle trigger.

12. An edger as claimed in claim 1, wherein said ground engaging wheel means rotates in a plane of rotation which is substantially parallel to, and closely spaced from, a plane in which said rotatable cutting device rotates.

13. An edger as claimed in claim 1, wherein said handle means includes handlegrips positioned one to either side of said plane of rotation of said cutting device.

14. An edger as claimed in claim 13, wherein said handlegrips are spaced apart by a distance greater than, or substantially equal to, the shoulder to shoulder spacing of said operator.

15. An edger as claimed in claim 1, having vibration damping means located between said frame and said handle means.

16. An edger as claimed in claim 1, including a brake means which when unactuated prevents rotation of said cutting device and which requires continuous actuation during operation to allow for rotation of said cutting device.

17. An edger as claimed in claim 1, wherein said handle means are generally of T-shaped configuration.

18. An edger as claimed in claim 1, wherein said handle means are generally of U-shaped configuration.

19. An edger as claimed in claim 1, wherein said handle means comprise a hollow substantially rectangular frame.

20. A gasoline powered lawn edger comprising:

a. a frame, at least one ground engaging wheel means supporting the frame;

b. a power unit carried by the frame; and, c. a cutting device rotatable by said power unit and height adjustment means to adjust the height of said cutting device relative to the ground, the improvement comprising a ground touching debris deflector carried on an axle of said wheel means, the height of said debris deflector relative to the ground being unchanged with operation of said height adjustment means.

* * * * *